US008478873B2

(12) United States Patent
Mitaru

(10) Patent No.: US 8,478,873 B2
(45) Date of Patent: Jul. 2, 2013

(54) TECHNIQUES FOR USE OF A SYSTEM-UNIQUE IDENTIFIER IN AN ARCHITECTURE HAVING A FILE SYSTEM UTILIZING DISTRIBUTED METADATA SERVERS

(75) Inventor: Alexandru Mitaru, Beaverton, OR (US)

(73) Assignee: Harmonic Inc., San Jose, CA (US)

( * ) Notice: Subject to any disclaimer, the term of this patent is extended or adjusted under 35 U.S.C. 154(b) by 1250 days.

(21) Appl. No.: 11/371,459

(22) Filed: Mar. 8, 2006

(65) Prior Publication Data
US 2007/0214146 A1 Sep. 13, 2007

(51) Int. Cl.
*G06F 15/173* (2006.01)
*G06F 15/16* (2006.01)

(52) U.S. Cl.
USPC ............ 709/226; 709/204; 709/228; 709/246

(58) Field of Classification Search
USPC .......................................................... 709/226
See application file for complete search history.

(56) References Cited

U.S. PATENT DOCUMENTS

| | | | |
|---|---|---|---|
| 5,884,322 A | 3/1999 | Sidhu | |
| 6,457,053 B1 | 9/2002 | Satagopan | |
| 6,532,217 B1 * | 3/2003 | Wootton et al. | 370/252 |
| 6,542,907 B1 | 4/2003 | Cohen | |
| 6,633,542 B1 * | 10/2003 | Natanson et al. | 370/235 |
| 6,769,033 B1 * | 7/2004 | Gallo et al. | 709/246 |
| 6,977,908 B2 | 12/2005 | de Azevedo et al. | |
| 6,978,398 B2 | 12/2005 | Harper et al. | |
| 7,024,494 B1 * | 4/2006 | Pathan et al. | 710/10 |
| 7,165,083 B2 | 1/2007 | Sakaguchi et al. | |
| 2002/0178162 A1 | 11/2002 | Ulrich et al. | |
| 2003/0028563 A1 * | 2/2003 | Stutz et al. | 707/513 |
| 2003/0187859 A1 | 10/2003 | Belov | |
| 2003/0187860 A1 | 10/2003 | Holland | |
| 2003/0187866 A1 | 10/2003 | Zelenka | |
| 2003/0187883 A1 | 10/2003 | Zelenka et al. | |
| 2004/0078633 A1 | 4/2004 | Holland | |
| 2004/0133577 A1 * | 7/2004 | Miloushev et al. | 707/10 |
| 2004/0133606 A1 * | 7/2004 | Miloushev et al. | 707/200 |
| 2004/0141008 A1 | 7/2004 | Jarczyk et al. | |
| 2004/0153479 A1 | 8/2004 | Mikesell et al. | |
| 2005/0027718 A1 | 2/2005 | Sakaguchi | |

(Continued)

FOREIGN PATENT DOCUMENTS

| | | |
|---|---|---|
| JP | 2005-502098 | 1/2005 |
| JP | 2005-050165 | 2/2005 |
| WO | 9532463 A | 11/1995 |

OTHER PUBLICATIONS

Flohr C, International Search Report, Written Opinion, and Notification, European Patent Office, Rijswijk, Netherlands, Jun. 8, 2007, 12 pages.

(Continued)

*Primary Examiner* — Richard G Keehn
(74) *Attorney, Agent, or Firm* — Hickman Palermo Truong Becker Bingham Wong LLP

(57) ABSTRACT

Use and generation of an identifier. An indication of a value to be used to generate system-unique identifiers is received. The indication and an associated count value are stored in a metadata server interconnected with one or more remote metadata servers. A modified value to be used to generate system-unique identifiers generated based, at least in part, on the indication and the associated count value is transmitted to a remote metadata server.

22 Claims, 4 Drawing Sheets

U.S. PATENT DOCUMENTS

| | | | |
|---|---|---|---|
| 2006/0080353 A1* | 4/2006 | Miloushev et al. | 707/102 |
| 2006/0101285 A1* | 5/2006 | Chen et al. | 713/193 |
| 2006/0112150 A1* | 5/2006 | Brown et al. | 707/201 |
| 2006/0116992 A1* | 6/2006 | Theobald et al. | 707/3 |
| 2006/0198311 A1* | 9/2006 | Molen et al. | 370/241 |
| 2007/0203943 A1* | 8/2007 | Adlung et al. | 707/104.1 |

OTHER PUBLICATIONS

C. Akinlar, et al., *A Scalable Bandwidth Guaranteed Distributed Continuous Media File System Using Network Attached Autonomous Disks*, IEEE Transactions on Multimedia, vol. 5, No. 1, Mar. 2003, ISSN: 1520-9210 (pp. 71-96).

Srinivas Eeda, *Oracle Cluster File System Physical Design & Implementation*, Oracle Corporation, California, USA, Dec. 2003 (65 pages).

Preslan, et al., *A 64-Bit, Shared disk File System for Linux*, Sixteenth IEEE Mass Storage Systems Symposium, Mar. 15-18, 1999 (pp. 22-41).

Anderson, et al., *xFS Project Architecture*, Silicon Graphics, Oct. 8, 1993 (pp. 1-15).

Shepard, et al., *SGI InfiniteStorage Shared Filesystem CXFS: A High Performance, Multi-OS Filesystem from SGI*, White Paper, Jun. 16, 2004 (19 pages).

*Implementing Total Data Life Management With StorNext Management Suite*, Advanced Digital Information Center, Washington, USA, ADIC White Paper 2004 (22 pages).

Ghemawat, et al., *The Google File System*, 19th ACM Symposium on Operating Systems Principles, New York, USA, Oct. 2003 (15 pages).

European Patent Office, "Communication pursuant to Article 94(3) EPC", Application No. 01924591.9-2211, dated Nov. 17, 2008, 5 pages.

Claims, Application No. 01924591.9-2211, 3 pages.

Shinkai, Y, et al., "HAMFS file system", Reliable Distributed Systems, 1999, Proceedings of the 18th IEEE Symposium, Oct. 1999, XP010356993, 12 pages.

European Patent Office, "Communication pursuant to Article 94(3) EPC", application No. 07752633.3-1527, dated Jan. 12, 2010, 6 pages.

Claims, application No. 07752633.3-1527, 4 pages.

Japanese Office Action received in International application No. 2008-558400 dated Apr. 24, 2012 (3 pages).

Japanese Current Claims in International application No. 2008-558400 dated Apr. 2012 (3 pages).

Japanese Office Action received in application serial No. 2008-558400 dated May 31, 2011, Applicant: Harmonic Inc., 2 pages.

Current Claims in Japanese application serial No. 2008-558400, Applicant: Harmonic Inc., dated May 2011, 3 pages.

* cited by examiner

TECHNIQUES FOR USE OF A SYSTEM-UNIQUE IDENTIFIER IN AN ARCHITECTURE HAVING A FILE SYSTEM UTILIZING DISTRIBUTED METADATA SERVERS

TECHNICAL FIELD

Embodiments of the invention relate to file system management. More particuraly, embodiments of the invention relate to techniques for use of a file management system having distributed metadata servers that may be used, for example, in a system that may support video editing, video archiving and/or video distribution.

BACKGROUND

In general, a file system is a program (or set of programs) that provides a set of functions related to the storage and retrieval of data. The data may be stored, for example, on a non-volatile storage device (e.g., hard disk) or volatile storage device (e.g., random access memory). Typically, there is a set of data (e.g., file name, access permissions) associated with a file that is referred to as "file metadata." This file metadata may be accessed during the process of accessing a file.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

System Overview

Figure 1:
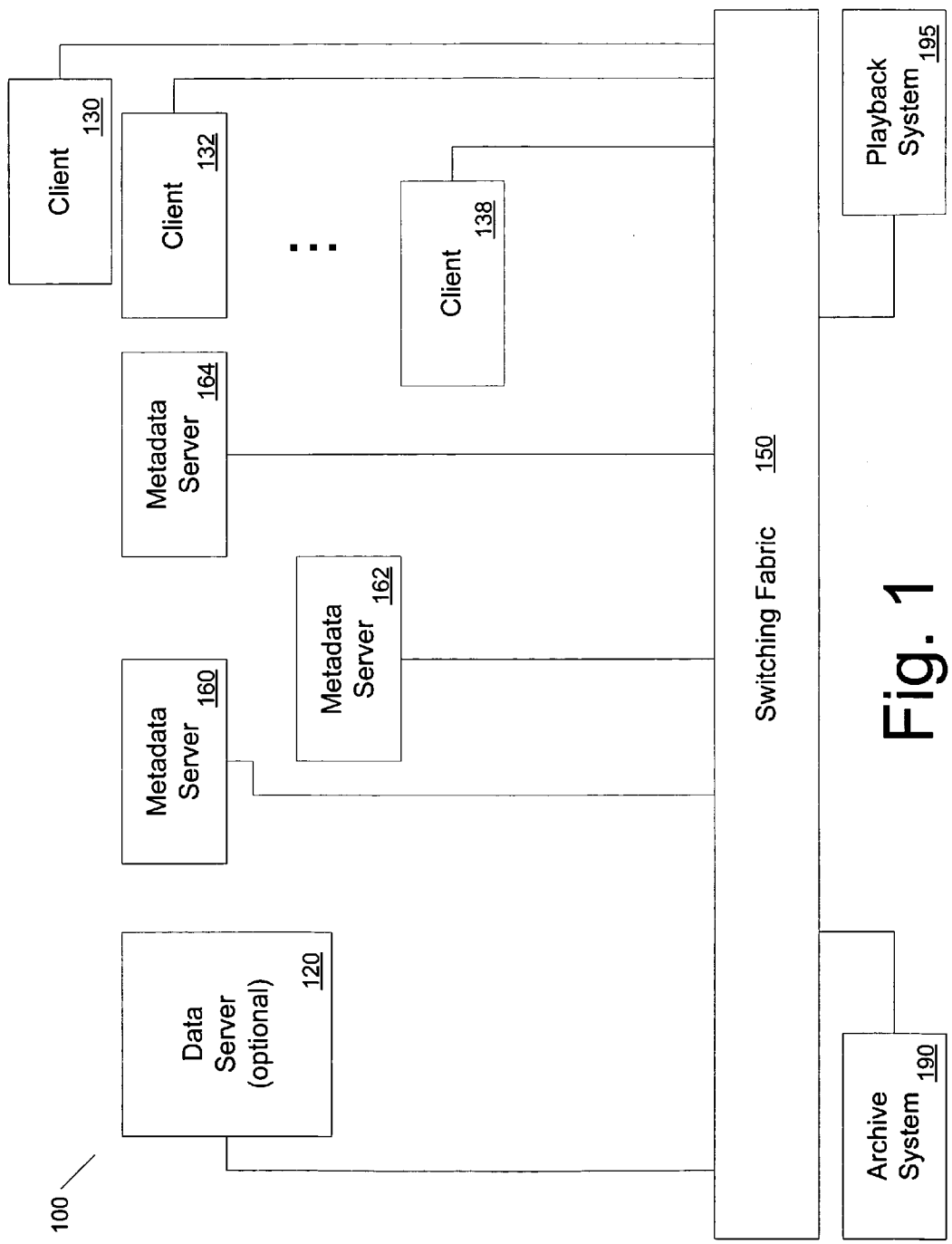
FIG. 1 is a block diagram of one embodiment of a system that may utilize a file system with distributed metadata servers.

FIG. 1 is a block diagram of one embodiment of a system that may utilize a file system with distributed metadata servers. In one embodiment, the various components of the system of FIG. 1 are interconnected using standard interconnection technologies (e.g., Ethernet, Gigabit Ethernet). For example, in one embodiment, switching fabric 150 may be a Gigabit Ethernet (or 10 Gigabit Ethernet) interconnection architecture to allow the various components of system 100 to communicate with each other.

In one embodiment, multiple client devices (e.g., 130, 132, . . . 138) may be interconnected via switching fabric 150. Client devices may allow users to access and/or otherwise utilize data available through system 100. In one embodiment, the client devices are computer systems having sufficient storage and input/output capability to allow users to manipulate data stored in various servers. For example, in a multimedia system, the client devices may allow users to access stored multimedia files as well as edit or otherwise utilize the multimedia files.

In one embodiment, the system of FIG. 1 may include any number of metadata servers, each of which may store metadata for files that are stored in the system. In one embodiment, a metadata server may be responsible for managing the file system and may be the primary point of contact for client devices. In one embodiment, each client device may include file system driver (FSD) software that may present a standard file system interface, for accessing files the system.

Figure 2:
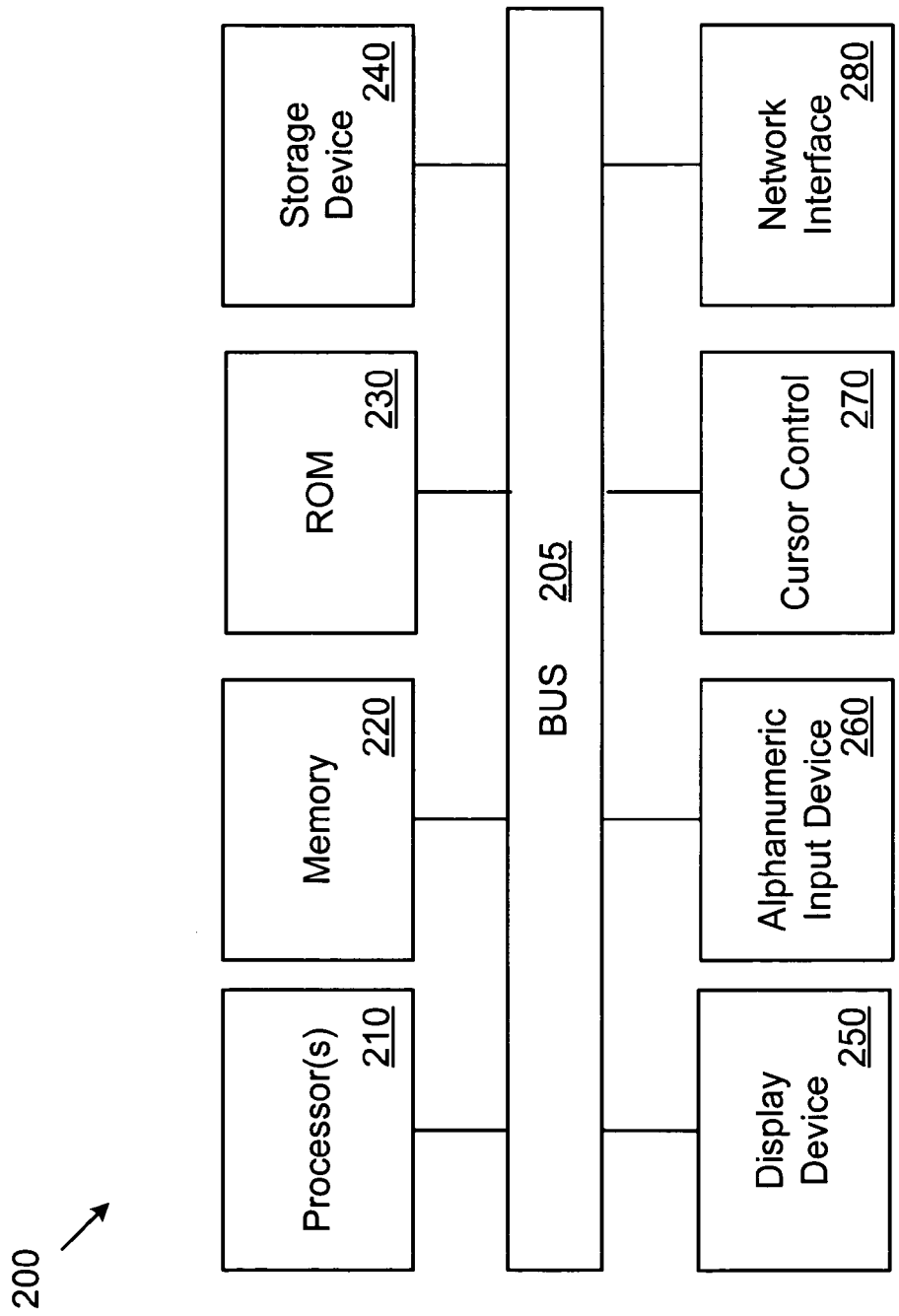
FIG. 2 is a block diagram of one embodiment of an electronic system.

In one embodiment, the various electronic systems of FIG. 1 (e.g., data servers, metadata servers, clients) as an electronic system such as, for example, the electronic system of FIG. 2. The electronic system illustrated in FIG. 2 is intended to represent a range of electronic systems, for example, computer systems, network access devices, etc. Alternative systems, whether electronic or non-electronic, can include more, fewer and/or different components.

Electronic system 200 includes bus 201 or other communication device to communicate information, and processor 202 coupled to bus 201 to process information. While electronic system 200 is illustrated with a single processor, electronic system 200 can include multiple processors and/or co-processors. Electronic system 200 further includes random access memory (RAM) or other dynamic storage device 204 (referred to as memory), coupled to bus 201 to store information and instructions to be executed by processor 202. Memory 204 also can be used to store temporary variables or other intermediate information during execution of instructions by processor 202.

Electronic system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to electronic system 200.

Electronic system 200 can also be coupled via bus 201 to display device 221, such as a cathode ray tube (CRT) or liquid crystal display (LCD), to display information to a user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221. Electronic system 200 further includes network interface 230 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 230) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Unique Shared Incrementing Values As File Identifiers

Distributed file systems, such as those described herein, require the ability to generate unique identifiers within the file system. These identifiers may be used, for example, to identify pieces of file data or to generate unique file handles. As described in greater detail below, use of a Unique Shared Incrementing Value (USIV) may be used as identifiers within a system. A USIV is a file system unique number used as a identifier for specific file system objects.

In one embodiment, the mechanism to generate and manage USIV requires the token mechanism described above. However, different communication mechanism that can insure a reliable and ordered sequencing could be used as a transport mechanism for the USIV management.

In one embodiment, a USIV is initiated as a small integer. A few small values (e.g., 0, 1, 2) may be reserved for special uses. In one embodiment, the value of the USIV may be transmitted as part of (or in association with) the token described above. In one embodiment, the USIV may be received by a metadata server, which may establish a "bucket" of local USIVs that may be used by the metadata server. The metadata server may then increment the USIV transmitted with the token by the number of values in the bucket. This allows the next metadata server to use non-overlapping USIVs.

Figure 3:
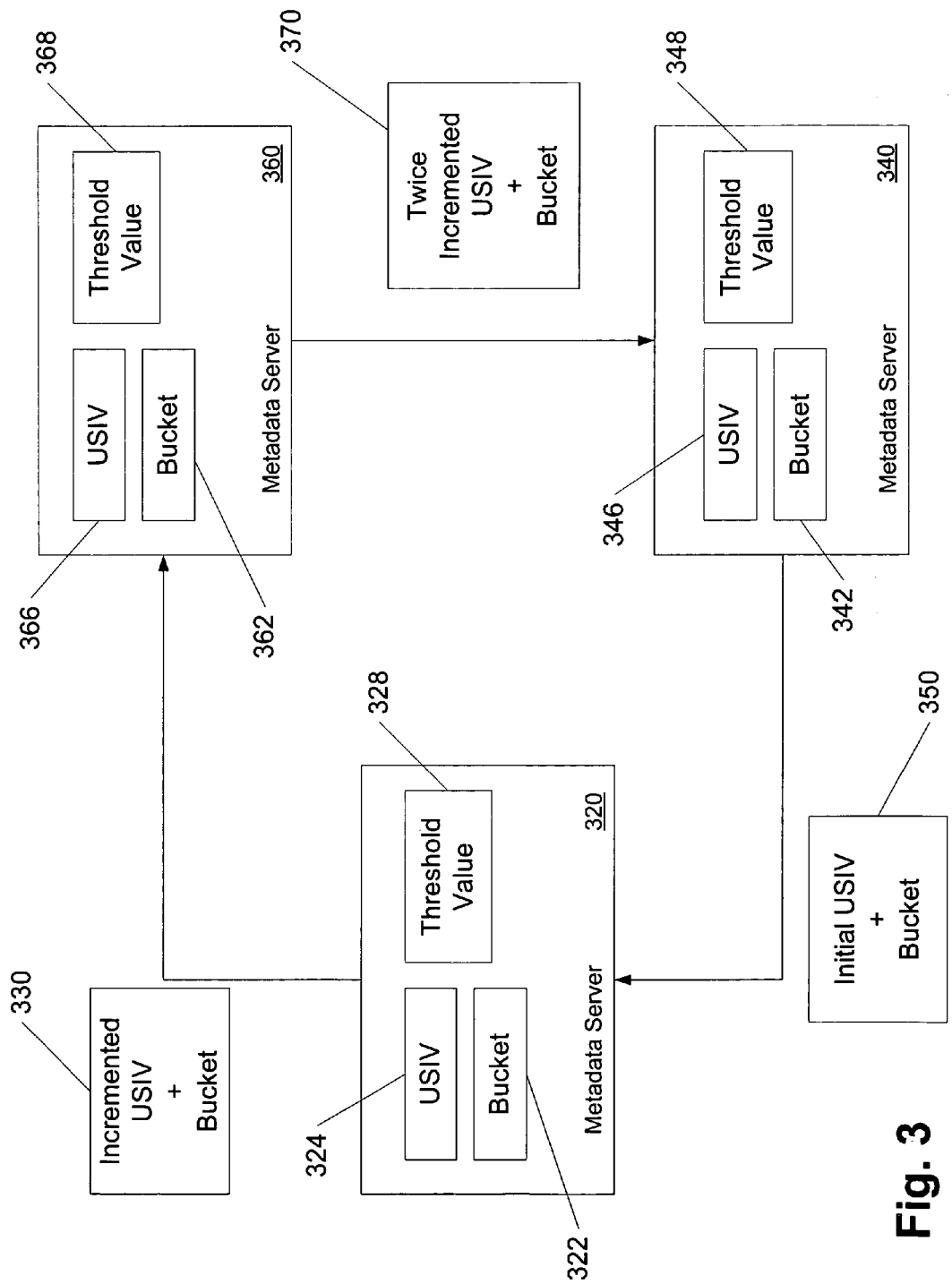
FIG. 3 is a conceptual illustration of Unique Shared Incrementing Values (USIVs) for use with three metadata servers.

FIG. 3 is a conceptual illustration of USIVs for use with three metadata servers. In the example of FIG. 3 three metadata servers are illustrated; however, any number of metadata servers may be supported. Also, the bucket values and threshold values for the different metadata servers may be consistent across one or more metadata servers or metadata servers may have different bucket values and threshold values.

In one embodiment, upon system initialization a first metadata server (e.g., metadata server 340) may receive or generate an initial USIV. The USIV may be stored by metadata server 340 in a register or other storage mechanism 346. Metadata server 340 may also store bucket value 342 that corresponds to a number of USIVs that metadata server may reserve for local use. In one embodiment, metadata server 340 may also store threshold value 348 that may be used to determine when metadata server 340 should obtain a new USIV and corresponding bucket.

In one embodiment, after storing USIV 346, metadata server 340 may send new USIV 350 to metadata server 320. In one embodiment, USIV 350 equals USIV 346 plus bucket value 342 plus one. For example, if USIV 346 is 50 and bucket value 342 is 1000, USIV 350 may be 1051, which is the next available USIV that may be used by metadata server 320.

Metadata server 320 may repeat the process performed by metadata server 340. That is, metadata server 320 may store USIV 350 as local USIV 324 and may store bucket value 322 and threshold value 328. Metadata server 320 may then generate new USIV 330, which may be USIV 324 plus bucket value 322 plus one. New USIV 350 may be transmitted to metadata server 360.

Metadata server 360 may repeat the process performed by metadata server 320. That is, metadata server 360 may store USIV 330 as local USIV 364 and may store bucket value 362 and threshold value 368. Metadata server 360 may then generate new USIV 370, which may be USIV 364 plus bucket value 362 plus one. New USIV 360 may be transmitted to metadata server 340.

In one embodiment, once each metadata server has a local USIV bucket and a threshold value, the metadata server may update the local USIV as necessary and not necessarily each time a new USIV is received, for example, in association with a token. In one embodiment, a metadata server may only acquire a new USIV when the threshold value indicates that a new USIV should be acquired. This may be accomplished, for example, the threshold value may, indicate a level below which the bucket value should not drop thus indicating that a new USIV and bucket value should be acquired, or the threshold value may indicate a USIV through which the local USIV should not pass thus indicating that a new USIV and bucket value should be acquired.

Figure 4:
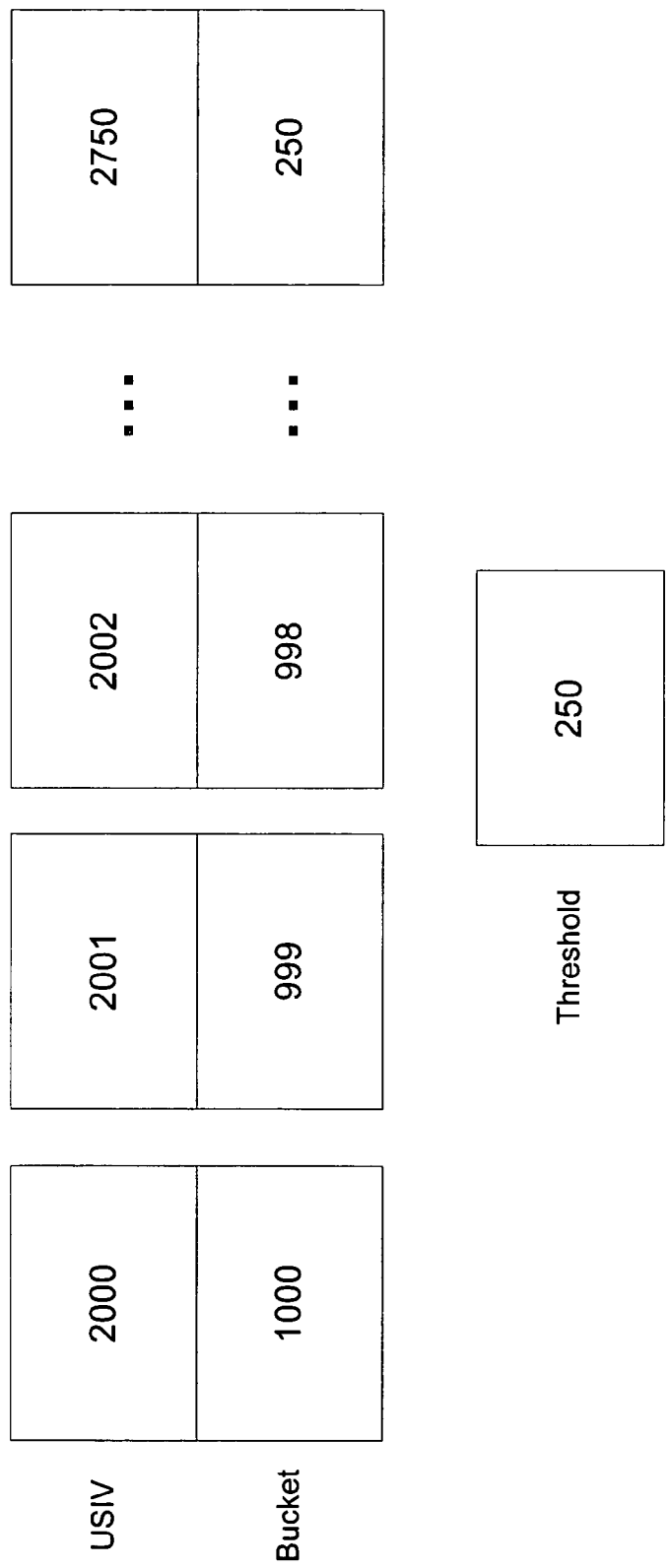
FIG. 4 is a conceptual illustration of a local USIV, bucket value and threshold value that may be stored in a metadata server.

FIG. 4 is a conceptual illustration of a local USIV, bucket value and threshold value that may be stored in a metadata server. FIG. 4 illustrates example values for the local USIV (e.g., 2000), the bucket value (e.g., 1000) and the threshold value (e.g., 250). When the metadata server requires a USIV, for example, to create a new file, the local USIV (2000) may be used for the file and the local USIV may be incremented (2001). In response to the USIV being incremented the bucket value may be decremented (e.g., 1000 to 999). This process may continue for each use of a local USIV.

In one embodiment, when the bucket value is equal to or less than the threshold value, the metadata server may be triggered to acquire a new USIV the next time that the token is received. The new USIV may be acquired as described above with respect to FIG. 3. The metadata server may function using the new USIV in the manner described above. Thus, each metadata server may reserve a local allotment of USIVs that may be used by the metadata server without central control over identifiers to be used in a system with distributed metadata servers.

Conclusion

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

receiving, at a metadata server of a set of metadata servers that is interconnected with one or more remote metadata servers of the set of metadata servers, an indication of a value to be used by the metadata server to generate system-unique identifiers that are unique among the set of metadata servers;

storing, by the metadata server, the indication and an associated count value;

wherein the associated count value specifies a number of system-unique identifiers that are reserved for use by the metadata server;

generating, by the metadata server, a modified value based at least in part on a sum of the value of the indication and the associated count value;

transmitting, from the metadata server to one of the remote metadata servers, the modified value for use in generating, at the one of the remote metadata servers, system-unique identifiers that are unique among the set of metadata servers;
generating, at the metadata server, system-unique identifiers that are unique among the set of metadata servers based, at least in part, on the value of the indication;
wherein the method is performed by one or more computing devices.

2. The method of claim 1 further comprising:
generating a system-unique identifier with the metadata server based, at least in part, on the value of the indication;
modifying the stored value of the indication in response to generation of the system-unique identifier; and
modifying the stored associated count value in response to generation of the system-unique identifier.

3. The method of claim 2 further comprising:
storing a threshold value associated with the indication; and
generating a signal when the value of the indication equals or exceeds the threshold value.

4. The method of claim 2 further comprising:
storing a threshold value associated with the count value; and
generating a signal when the count value is equaled or exceeded by the threshold.

5. The method of claim 1 wherein the indication of the value to be used to generate the system-unique identifiers is received in association with a token, wherein only one metadata server of the set of metadata servers controls the token at a time.

6. The method of claim 1 wherein the metadata server and the one or more remote metadata servers are interconnected as a directional ring.

7. A system comprising:
a non-transitory interconnection mechanism to carry data between a source and a destination;
a plurality of metadata servers logically interconnected via the interconnection mechanism, each metadata server of the plurality of metadata servers configured
to receive an indication of a value to be used by the metadata server to generate system-unique identifiers that are unique among the plurality of metadata servers,
to store the indication and an associated count value, wherein the associated count value specifies a number of available system-unique identifiers that are reserved for use by the metadata server,
to generate a modified value based at least in part on a sum of the value of the indication and the associated count value, and
to transmit, from the metadata server to a remote metadata server of the plurality of metadata servers, the modified value to be used to generate, at the remote metadata server, system-unique identifiers that are unique among the plurality of metadata servers.

8. The system of claim 7 wherein the plurality of metadata servers are interconnected as a directional ring.

9. The system of claim 7 wherein the indication of the value to be used to generate the system-unique identifiers is received in association with a token, wherein only one metadata server of the plurality of metadata servers controls the token at a time.

10. The system of claim 7 wherein each metadata server further generates a system-unique identifier with the metadata server based, at least in part, on the value of the indication, modifies the stored value of the indication in response to generation of the system-unique identifier, and modifies the stored associated count value in response to generation of the system-unique identifier.

11. An article comprising a non-transitory computer-readable storage device having stored thereon instructions that, when executed, cause one or more processors to:
receive, at a metadata server of a set of metadata servers that is interconnected with one or more remote metadata servers of the set of metadata servers, an indication of a value to be used by the metadata server to generate system-unique identifiers that are unique among the set of metadata servers;
store, by the metadata server, the indication and an associated count value;
wherein the associated count value specifies a number of system-unique identifiers that are reserved for use by the metadata server;
generating, by the metadata server, a modified value based at least in part on a sum of the value of the indication and the associated count value; and
transmit, from the metadata server to one of the remote metadata servers the modified value to be used, at the one of the remote metadata servers, to generate system-unique identifiers that are unique among the set of metadata servers.

12. The article of claim 11 further comprising instructions that, when executed cause the one or more processors to:
generate a system-unique identifier with the metadata server based, at least in part, on the value of the indication;
modify the stored value of the indication in response to generation of the system-unique identifier; and
modify the stored associated count value in response to generation of the system-unique identifier.

13. The article of claim 12 further comprising instructions that, when executed, cause the one or more processors to:
store a threshold value associated with the indication; and
generate a signal when the value of the indication equals or exceeds the threshold value.

14. The article of claim 12 further comprising instructions that, when executed, cause the one or more processors to:
store a threshold value associated with the count value; and
generate a signal when the count value is equaled or exceeded by the threshold value.

15. The article of claim 11 wherein the indication of the value to be used to generate the system-unique identifiers is received in association with a token, wherein only one metadata server of the set of metadata servers controls the token at a time.

16. The article of claim 11 wherein the metadata server and the one or more remote metadata servers are interconnected as a directional ring.

17. A method comprising:
receiving, at a first metadata server, a first indication of a value;
generating, at the first metadata server, based at least in part on the value, a first set of system-unique identifiers, wherein the first set of system-unique identifiers are reserved for local use by the first metadata server and are unique among a set of metadata servers that includes the first metadata server;
transmitting, from the first metadata server to a second metadata server of the set of metadata servers, a second indication of an updated value, wherein the updated value is based, at least in part, on the value of the first indication and a number of system-unique identifiers in the first set of system-unique identifiers;

wherein the updated value is useable for generating, at the second metadata server, a second set of system-unique identifiers that are unique among the set of metadata servers;

wherein the second set of system-unique identifiers are reserved for local use by the second metadata server, and wherein the second set of system-unique identifiers does not overlap with the first set of system-unique identifiers;

wherein the method is performed by one or more computing devices.

18. The method of claim 17, wherein the indication of the value is received in association with a token and the updated value is transmitted in association with the token, and wherein only one metadata server of the set of metadata severs controls the token at a time.

19. The method of claim 17, further comprising:

in response to a system-unique identifier in the first set of system-unique identifiers being used by the first metadata server, decrementing a bucket value;

in response to the bucket value being below a threshold, receiving at the first metadata server, a third indication of a second updated value;

generating, at the first metadata server, based at least in part on the second updated value, a third set of system-unique identifiers, wherein the third set of system-unique identifiers are to be reserved for local use by the first metadata server, and wherein the third set of system-unique identifiers does not overlap with the first set of system-unique identifiers or the second set of system-unique identifiers.

20. An article comprising a non-transitory computer-readable storage device having stored thereon instructions that, when executed, cause one or more processors to:

receive, at a first metadata server, a first indication of a value;

generate, at the first metadata server, based at least in part on the value, a first set of system-unique identifiers, wherein the first set of system-unique identifiers are reserved for local use by the first metadata server and are unique among a set of metadata servers that includes the first metadata server;

transmit, from the first metadata server to a second metadata server of the set of metadata servers, a second indication of an updated value, wherein the updated value is based, at least in part, on the value of the first indication and the number of system-unique identifiers in the first set of system-unique identifiers;

wherein the updated value is useable for generating, at the second metadata server, a second set of system-unique identifiers that are unique among the set of metadata servers;

wherein the second set of system-unique identifiers are reserved for local use by the second metadata server, and wherein the second set of system-unique identifiers does not overlap with the first set of system-unique identifiers; and wherein the method is performed by one or more computing devices.

21. The article of claim 20, wherein the indication of the value is received in association with a token and the updated value is transmitted in association with the token, and wherein only one metadata server of the set of metadata severs controls the token at a time.

22. The article of claim 20, wherein the instructions, when executed, further cause one or more processors to:

in response to a system-unique identifier in the first set of system-unique identifiers being used by the first metadata server, decrement a bucket value;

in response to the bucket value being below a threshold, receive at the first metadata server, a third indication of a second updated value;

generate, at the first metadata server, based at least in part on the second updated value, a third set of system-unique identifiers, wherein the third set of system-unique identifiers are to be reserved for local use by the first metadata server, and wherein the third set of system-unique identifiers does not overlap with the first set of system-unique identifiers or the second set of system-unique identifiers.

* * * * *